United States Patent [19]

Beasley

[11] Patent Number: 5,139,229
[45] Date of Patent: Aug. 18, 1992

[54] BALL VALVE AND METHOD OF ASSEMBLY

[75] Inventor: Marvin E. Beasley, Houston, Tex.

[73] Assignee: Keystone International Holdings Corp., Houston, Tex.

[21] Appl. No.: 793,554

[22] Filed: Nov. 18, 1991

[51] Int. Cl.⁵ ................................................ F16K 5/20
[52] U.S. Cl. ..................................... 251/174; 137/15; 29/124
[58] Field of Search ................. 251/174, 315; 137/15; 29/890, 124

[56] References Cited

U.S. PATENT DOCUMENTS 4,467,823  8/1984  Shoffer et al. ................. 251/315 X 4,779,840 10/1988  Andrea ........................... 251/174

Primary Examiner—John C. Fox
Attorney, Agent, or Firm—Dodge, Bush, Moseley & Riddle

[57] ABSTRACT

A ball valve (10) has a one-piece valve body (12) with a small diameter bore (16) and an opposed large diameter bore (18) in fluid communication with a valve chamber (14). An annular flange (40) projects within the large diameter bore (18) and a washer-type square spring (50) is inserted within the central opening (44) defined by the flange (40) and then positioned in centered relation on the shoulder (42) defined by the flange (40) for urging the ball valve member (24) into seated position against an annular seat (22) about small diameter bore (16).

7 Claims, 1 Drawing Sheet

BALL VALVE AND METHOD OF ASSEMBLY

FIELD OF THE INVENTION

This invention relates to a ball valve and method of assembly, and more particularly to such a ball valve and assembly method in which a ball valve member and spring urged follower are positioned within an end of the valve body.

BACKGROUND OF THE INVENTION

Heretofore, ball valves have been provided in which the ball valve member has been inserted within the end of a one piece valve body for assembly. For example, U.S. Pat. No. 3,348,805 dated Oct. 24, 1967 shows a ball valve in which a spherical ball may be inserted through one end of a one piece valve body with a seat then being inserted against the ball and secured by a locking ring. However, the seat is not spring urged against the ball.

While spring urged seats have been utilized and assembled within a ball valve body heretofore, such spring urged seats have been mounted within so-called top entry or end entry ball valves in which a removable body portion is mounted on the main body portion after insertion of the ball and seat member. For example, U.S. Pat. No. 4,658,978 dated Apr. 21, 1987 shows a so-called top entry ball valve in which an upper cover plate or bonnet is connected to the main body portion after insertion of the ball and spring urged seat within the valve body. Likewise, U.S. Pat. No. 3,281,112 dated Oct. 25, 1966 and U.S. Pat. No. 3,387,815 dated Jun. 11, 1968 each shows a ball valve in which an end body portion is secured to a main body portion after insertion of the ball and spring urged seat within the main body portion.

SUMMARY OF THE INVENTION

The present invention is directed to a method of assembly of a ball valve in which the spherical ball or ball valve member is inserted within an integral or one piece valve body and then a spring urged seat ring or follower is inserted against the ball and secured in position. A washer-type spring for urging the circular seat ring against the ball is non-circular in shape and has at least two widths of different dimensions thereby to provide a minimum width and a maximum width.

The washer-type spring is mounted on an annular shoulder or ledge projecting inwardly from a large diameter bore in the valve body and defining a central opening through which the washer-type spring is initially passed along its small diameter width. After passing the shoulder, the spring is turned in such a manner that the large diameter width is supported on the shoulder compressed against the adjacent peripheral surface defining the large diameter bore. The washer-type spring which is preferably a Belleville spring is biased between the shoulder and the follower for urging the seat against the ball. The washer-type spring is preferably of a generally square configuration or shape with beveled corners as viewed in plan.

It is an object of this invention to provide a method of assembling a ball and spring urged seat in a ball valve from an end of an integral valve body of the ball valve.

It is a further object of this invention to provide such a method in which a non-circular washer-type spring is utilized for urging a seat into engagement with the ball.

Also an object is to provide an assembly method for an end entry ball valve that is quick to assemble, secure and requires no welding.

Other objects, advantages, and features of this invention will become more apparent after referring to the following specification and drawings.

DESCRIPTION OF THE INVENTION

Figure 1:
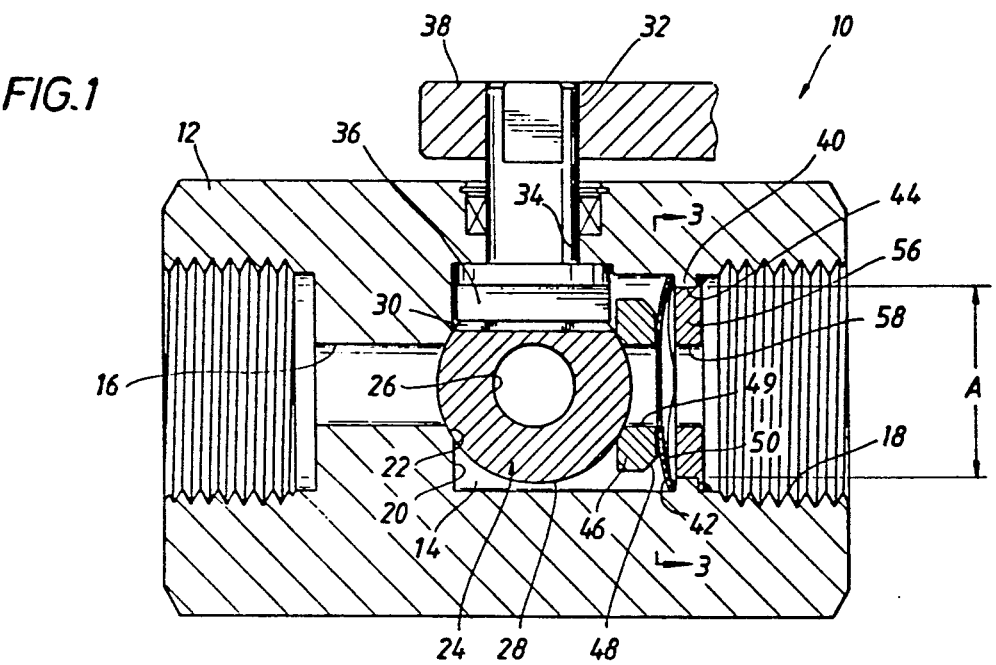
FIG. 1 is a cross sectional view of a ball valve assembled in accord with the method comprising the present invention.
Figure 2:
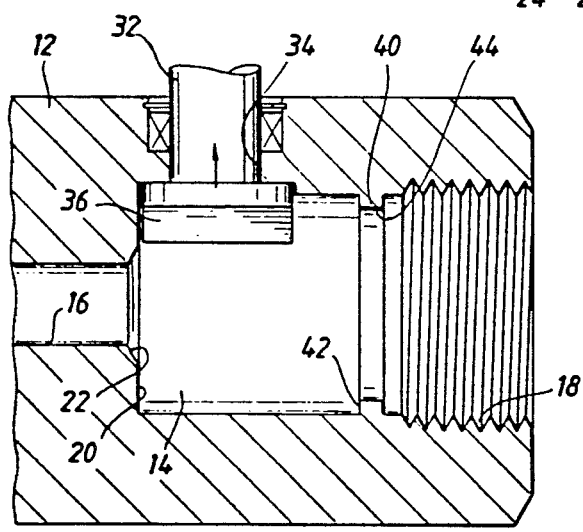
FIG. 2 is an exploded view of the ball valve shown in FIG. 1 with the ball valve member and spring urged seat removed from the one piece body.
Figure 2:
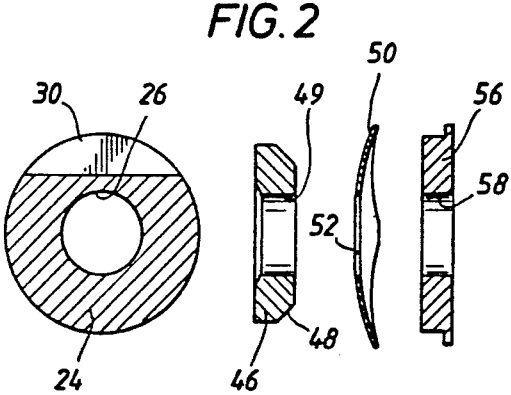

Referring now to the drawings for a better understanding of this invention, a ball valve formed in accordance with the method of this invention is illustrated generally at 10. Ball valve 10 has an integral one piece valve body 12 having a valve chamber 14. A small diameter end bore 16 and an opposed large diameter end bore 18 are in fluid communication with valve chamber 14. Suitable fluid conduits (not shown) may be threaded or welded within end bores 16 and 18 for the flow of fluid through valve 10 from associated flow passages.

A shoulder or abutment 20 on valve body 12 is provided at the juncture of small diameter bore 16 and valve chamber 14. A valve seat 22 is integrally formed by shoulder 20. A ball valve member 24 is mounted in chamber 14 for rotation between open and closed positions. Ball valve member 24 has a central bore 26 therethrough, a spherical outer surface 28, and an elongate slot 30 in spherical surface 28. A stem 32 extends through an opening 34 in valve body 12 and has an elongate tang or key 36 on its inner end fitting within slot 30. A manually operated handle 38 is connected to the outer end of stem 32 for rotation of ball valve member 24 between open and closed positions.

An annular flange 40 integral with valve body 12 projects inwardly within large diameter bore portion 18 to define an inner shoulder or ledge 42 and a circular central opening 44 having a diameter illustrated at A. An annular seat ring 46 having a beveled edge 48 and a central opening 49 is urged into engagement with spherical surface 28 of ball valve member 24 by a non-circular washer-type Belleville spring generally indicated at 50. Spring 50 forms an important part of this invention and is utilized in the method of assembling ball valve 10. Spring 50 is of a square shape defining sides 51 and beveled corners 54a, b, c and d which would form if connected a generally cylindrical surface. A central opening 52 extends through spring 50. Spring 50 has a minimum width shown at D between a pair of parallel sides 51 and a maximum width shown at E between opposed corners 54b and 54d. Minimum width D is less than diameter A of central opening 44 formed by flange 40 and maximum width E is greater than diameter A. Spring 50 is compressed between seat follower 46 and shoulder 42. A separate insert 56 is tack welded to flange 40 and has an opening 58 therethrough. Small diameter bore 16 defines the downstream flow passage and the upstream flow passage is defined by the aligned openings 49 and 58 in seat ring 46 and insert 56. It may be desirable to omit insert 56 under certain conditions as spring 50 functions independently of insert 56.

Figure 3:
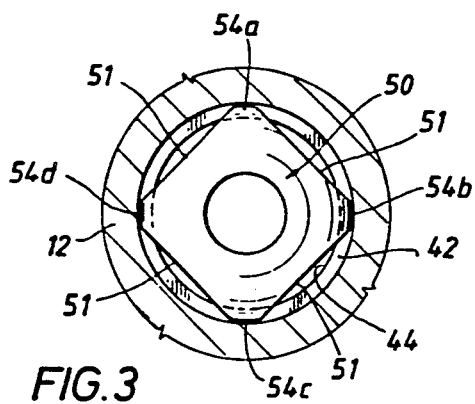
FIG. 3 is a view taken generally along line 3—3 of FIG. 1 and showing the noncircular spring mounted on the shoulder extending inwardly of the valve body.
Figure 4:
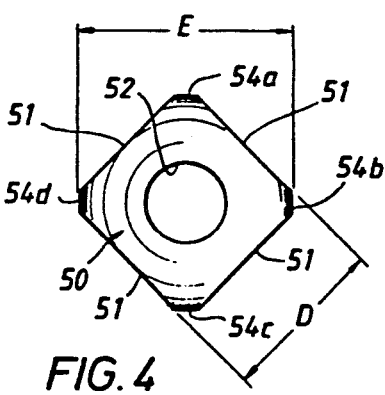
FIG. 4 is a top plan of the washer-type spring removed from the valve body.

For assembly of ball valve 10 from valve body 12, stem 32 is inserted through end bore 18 and opening 34 in valve body 12 with tang or key 36 projecting within valve chamber 14. Then, ball valve member 24 is inserted within end bore 18 with tang 36 being received within slot 30. Next, seat ring 46 is positioned against ball valve member 24. Spring 50 is then inserted within large diameter bore 18 and tilted slightly so that corners 54a and b pass opening 44 along small width D and are directed over ledge 42 by beveled edge 48 on seat follower 46. Corners 54c and d are restricted by flange 40 from passing through opening 44 and an axial force is applied against corners 54c and d by a suitable tool such as a screwdriver thereby to compress spring 50 to permit corners 54c and d to clear flange 40 for passing through opening 44 and positioning adjacent ledge 42. Spring 50 is then returned to a centered position relative to ledge 42 and opening 44 so that all corners 54a-d of spring 50 are in uniform contact with ledge 42 as indicated in FIG. 3. Thus, spring 50 is biased between shoulder 42 and seat ring 46 for continuously urging seat ring 46 against ball valve member 24 and urging ball valve member 24 into sealing engagement against seat 22. Insert 56 is then tack welded in position against flange 40. From the above, a simple and quick method of assembly of ball valve 10 has been provided by the present invention utilizing spring 50.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A method of assembling a ball valve comprising the following steps:
   providing a valve body having a valve chamber and opposed end bores in fluid communication with said valve chamber to define flow passages, one of said end bores being of a large diameter generally similar to the diameter of the valve chamber and the other end bore being of a small diameter generally similar to the diameter of a flow passage through the valve body;
   providing an inwardly extending flange integral with said valve body projecting within said large diameter bore to form an inner annular shoulder projecting within said large diameter bore adjacent said valve chamber, said shoulder defining a central opening smaller than the diameter of said large diameter end bore;
   inserting a ball valve member having a spherical surface through said central opening into said valve chamber;
   inserting an annular seat ring of a diameter less than the diameter of said central opening within said central opening against the spherical surface of said ball valve member;
   providing a washer-type spring of a non-circular shape to define a minimal width and a maximum width, said minimal width being less than the diameter of said central opening and said maximum width being greater than the diameter of said central opening;
   inserting said washer-type spring through said central opening against said annular seat ring with said minimum width passing said shoulder; and
   positioning said washer-type spring after passing through said central opening in a generally centered position with respect to said shoulder so that said washer-type spring at its maximum width is supported against said shoulder for biasing said spring between said flange and said annular seat ring thereby to urge said seat ring continuously into contact with said ball valve member.

2. A method of assembling a ball valve as set forth in claim 1 further including the steps of:
   providing an elongate slot in an outer surface of said ball valve member;
   inserting a stem having a key on its inner end within the valve body with said key projecting within the valve chamber; and
   inserting said ball valve member within said valve body with said key being received within said elongate slot.

3. A method of assembling a ball valve as set forth in claim 2 further including the steps of forming the valve body of an integral one piece member and forming an annular seat for said ball valve member about said other end bore.

4. A method of assembling a ball valve comprising the following steps:
   providing a one piece valve body having a valve chamber and opposed end bores in fluid communication with said valve chamber to define flow passages, one of said end bores being of a large diameter generally similar to the diameter of the valve chamber and the other end bore being of a small diameter generally similar to the diameter of a flow passage through the valve body;
   providing an integral annular valve seat on said valve body about said small diameter bore adjacent said valve chamber;
   providing an inwardly extending annular flange projecting within said large diameter bore adjacent said valve chamber with said flange defining a generally circular central opening smaller than the diameter of said large diameter bore and an inner projecting shoulder adjacent said central opening;
   inserting a ball valve member having a spherical surface through said circular central opening into said valve chamber against said annular valve seat formed integral with said valve body and in contact with said ball valve member;
   inserting an annular seat ring of a diameter less than the diameter of said central opening within said central opening against the spherical surface of said ball valve member;
   providing a resilient washer-type spring of a non-circular shape to define a minimal width and a maximum width, said minimal width being less than the diameter of said central opening and said maximum width being greater than the diameter of said central circular opening;
   inserting said washer-type spring through said circular central opening against said annular seat ring; and
   manipulating said washer-type spring after passing through said central opening so that the maximum width of said washer-type spring is supported against said flange thereby to compress said spring between said flange and said annular seat ring for urging said seat ring continuously into contact with said ball valve member for maintaining said ball valve member in contact with said integral valve seat on said valve body.

5. A ball valve comprising:
a valve body having a valve chamber and opposed end bores in fluid communication with said valve chamber, one of said end bores being of a large diameter generally similar to the diameter of the valve chamber and the other end bore being of a small diameter generally similar to the diameter of a flow passage through the valve body;
a ball valve member in said valve chamber mounted for rotation between open and closed positions relative to said flow passages;
an annular shoulder projecting within said large diameter bore adjacent said valve chamber and defining a circular central opening of a diameter less than the diameter of said large diameter bore;
an annular seat ring of a diameter less than said central opening positioned in contact with said ball valve member; and
a non-circular Belleville washer-type spring having a minimal width less than the diameter of said central opening and a maximum width greater than the diameter of said central opening, said Belleville washer-type spring being supported on said projecting shoulder and biased between said projecting shoulder and said annular seat ring for urging said seat ring into contact with said ball valve member.

6. A ball valve comprising:
a valve body having a valve chamber and opposed end bores in fluid communication with said valve chamber, one of said end bores being of a large diameter generally similar to the diameter of the valve chamber and the other end bore being of a small diameter generally similar to the diameter of a flow passage through the valve body;
a ball valve member in said valve chamber mounted for rotation between open and closed positions relative to said flow passages;
an annular shoulder projecting within said large diameter bore adjacent said valve chamber and defining a circular central opening;
an annular seat ring of a diameter less than said central opening positioned in contact with said ball valve member; and
a non-circular washer-type Belleville spring of a generally square shape having tapered corners and having a minimal width less than the diameter of said central opening and a maximum width greater than the diameter of said central opening, said washer-type spring being supported on said shoulder and biased between said shoulder and said annular seat ring for urging said seat ring into contact with said ball valve member.

7. A ball valve comprising:
a valve body having a valve chamber and opposed end bores in fluid communication with said valve chamber, one of said end bores being of a large diameter generally similar to the diameter of the valve chamber and the other end bore being of a small diameter generally similar to the diameter of a flow passage through the valve body;
a ball valve member in said valve chamber mounted for rotation between open and closed postions relative to said flow passages;
an annular shoulder projecting within said large diameter bore adjacent said valve chamber and defining a circular central opening;
an annular seat ring of a diameter less than said central opening positioned in contact with said ball valve member;
a non-circular washer-type spring having a minimal width less than the diameter of said central opening and a maximum width greater than the diameter of said central opening, said washer-type spring being supported on said shoulder and biased between said shoulder and said annular seat ring for urging said seat ring into contact with said ball valve member;
an annular flange projecting within said large diameter bore forming said annular shoulder on an inner face thereof; and
a separate annular insert secured to said flange and defining a flow passage therethrough.

* * * * *